(12) United States Patent
Furcoiu

(10) Patent No.: US 11,162,621 B2
(45) Date of Patent: Nov. 2, 2021

(54) GLAND ASSEMBLY

(71) Applicant: Mueller International, LLC, Atlanta, GA (US)

(72) Inventor: Aurelian Ioan Furcoiu, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 310 days.

(21) Appl. No.: 16/266,835

(22) Filed: Feb. 4, 2019

(65) Prior Publication Data

US 2020/0248848 A1 Aug. 6, 2020

(51) Int. Cl.
*F16L 21/04* (2006.01)
*F16L 21/08* (2006.01)
*F16L 21/00* (2006.01)

(52) U.S. Cl.
CPC ........... *F16L 21/045* (2013.01); *F16L 21/007* (2013.01); *F16L 21/08* (2013.01)

(58) Field of Classification Search
CPC ......... F16L 21/04; F16L 21/08; F16L 21/045; F16L 21/007; F16L 25/065; F16L 37/1205; F16L 37/127
USPC ....................................................... 285/337
See application file for complete search history.

(56) References Cited

U.S. PATENT DOCUMENTS

| | | |
|---|---|---|
| 1,945,293 A | 1/1934 | Pierce |
| 1,964,044 A | 6/1934 | Engel |
| 2,355,407 A | 8/1944 | Wyss |
| 2,394,351 A | 2/1946 | Wurzburger |
| 2,693,374 A | 11/1954 | Wurzburger |
| 2,887,328 A | 5/1959 | Risley et al. |
| 3,081,102 A | 3/1963 | Murray et al. |
| 3,150,876 A | 9/1964 | Lafferty |
| 3,162,469 A | 12/1964 | Shohan |
| 3,163,432 A | 12/1964 | De Boer |
| 3,179,446 A | 4/1965 | Paterson |
| 3,186,741 A | 6/1965 | Kurtz |
| 3,211,472 A | 10/1965 | Rickard |
| 3,249,371 A | 3/1966 | Peterman |
| 3,252,192 A | 5/1966 | Smith |
| 3,315,970 A | 4/1967 | Holoway |
| 3,315,971 A | 4/1967 | Sakurada |

(Continued)

FOREIGN PATENT DOCUMENTS

| | | |
|---|---|---|
| CA | 2458710 | 8/2005 |
| CA | 2458788 | 8/2005 |

(Continued)

OTHER PUBLICATIONS

Furcoiu, Aurelian Ioan; Final Office Action for U.S. Appl. No. 15/882,512, filed Jan. 29, 2018, dated Jan. 28, 2021, 20 pgs.

(Continued)

*Primary Examiner* — Zachary T Dragicevich
(74) *Attorney, Agent, or Firm* — Taylor English Duma LLP

(57) ABSTRACT

A gland assembly and a method for using a gland assembly are disclosed. The gland assembly can comprise a gland, the gland defining a gland bore; a joint restraint assembly comprising; a restraint base formed on the gland; a gripper disposed within the restraint base; and a spring comprising a retention tab and an engagement leg, the engagement leg configured to engage the gripper; and a gasket defining a recess, the retention tab configured to engage the recess.

17 Claims, 8 Drawing Sheets

(56) References Cited

U.S. PATENT DOCUMENTS

| | | |
|---|---|---|
| 3,414,273 A | 12/1968 | Sumner |
| 3,432,190 A | 3/1969 | Kunz |
| 3,485,515 A | 12/1969 | Frishof |
| 3,573,871 A | 4/1971 | Warner et al. |
| 3,642,306 A | 2/1972 | Gheen et al. |
| 3,653,695 A | 4/1972 | Dunton et al. |
| 3,680,874 A | 8/1972 | Schwarz |
| 3,684,317 A | 8/1972 | Kazienko et al. |
| 3,698,744 A | 10/1972 | Bevington |
| 3,877,733 A | 4/1975 | Straub |
| 3,980,097 A | 9/1976 | Ellis |
| 4,092,036 A | 5/1978 | Sato et al. |
| 4,380,348 A | 4/1983 | Swartz |
| 4,397,485 A | 8/1983 | Wood |
| 4,410,479 A | 10/1983 | Cyriax |
| 4,522,434 A | 6/1985 | Webb |
| 4,538,841 A | 9/1985 | Royston |
| 4,544,188 A | 10/1985 | Dugger |
| 4,568,112 A | 2/1986 | Bradley, Jr. et al. |
| 4,569,542 A | 2/1986 | Anderson et al. |
| 4,609,210 A | 9/1986 | Torokvei et al. |
| 4,629,176 A | 12/1986 | Ceelen |
| 4,664,426 A | 5/1987 | Ueki |
| 4,741,356 A | 5/1988 | Letzo et al. |
| 4,768,813 A | 9/1988 | Timmons |
| 4,779,900 A | 10/1988 | Shumard |
| 4,791,952 A | 12/1988 | Laurel |
| 4,848,808 A | 7/1989 | Pannell et al. |
| 4,858,968 A | 8/1989 | Moebius |
| 4,890,967 A | 1/1990 | Rosenbaum |
| 5,069,490 A | 12/1991 | Halen, Jr. |
| 5,071,175 A | 12/1991 | Kennedy, Jr. |
| 5,121,946 A | 6/1992 | Jardine |
| 5,205,568 A | 4/1993 | Stoll et al. |
| 5,232,252 A | 8/1993 | Bartholomew |
| 5,297,826 A | 3/1994 | Percebois et al. |
| 5,324,083 A | 6/1994 | Vogelsang |
| 5,335,946 A | 8/1994 | Dent et al. |
| 5,398,980 A | 3/1995 | Hunter |
| 5,437,481 A | 8/1995 | Spears et al. |
| 5,468,025 A | 11/1995 | Adinolfe et al. |
| 5,476,292 A | 12/1995 | Harper |
| 5,498,042 A | 3/1996 | Dole |
| 5,505,499 A | 4/1996 | Wallbank |
| 5,544,922 A * | 8/1996 | Shumard .............. F16L 25/065 285/337 |
| 5,803,110 A | 9/1998 | Segal |
| 5,851,037 A | 12/1998 | Bridges |
| 5,941,576 A | 8/1999 | Krausz |
| 6,106,029 A | 8/2000 | Demore et al. |
| 6,173,993 B1 | 1/2001 | Shumard et al. |
| 6,273,469 B1 | 8/2001 | Kwaske et al. |
| 6,364,372 B1 | 4/2002 | Marandi |
| 6,457,718 B1 | 10/2002 | Quesada |
| 6,481,762 B1 | 11/2002 | Rex et al. |
| 6,830,268 B2 | 12/2004 | Krausz |
| 7,232,160 B2 | 6/2007 | Krausz |
| 7,243,955 B2 | 7/2007 | Krausz |
| 7,469,939 B2 | 12/2008 | Vvestman et al. |
| 7,571,940 B2 | 8/2009 | Krausz |
| D602,127 S | 10/2009 | Shah et al. |
| 7,625,018 B2 | 12/2009 | Krausz |
| 7,654,586 B2 | 2/2010 | Krausz |
| 7,748,753 B2 | 7/2010 | Krausz |
| 7,837,238 B2 | 11/2010 | Krausz |
| 7,883,126 B2 | 2/2011 | Terry et al. |
| 7,997,626 B2 | 8/2011 | Krausz |
| 7,997,628 B1 | 8/2011 | Smith, Jr. et al. |
| 8,042,816 B2 | 10/2011 | Krausz |
| 8,313,124 B2 | 11/2012 | Krausz |
| 8,408,606 B2 | 4/2013 | Krausz |
| 8,651,530 B2 | 2/2014 | Krausz |
| 8,857,861 B2 | 10/2014 | German |
| 8,870,189 B2 | 10/2014 | Krausz |
| 8,960,683 B2 | 2/2015 | Krausz |
| 8,960,729 B2 | 2/2015 | Chiproot |
| D724,185 S | 3/2015 | Chiproot |
| 9,086,177 B2 | 7/2015 | Artsiely |
| 9,109,701 B1 | 8/2015 | Copeland |
| 9,163,760 B2 | 10/2015 | Lundstrom et al. |
| 9,441,771 B2 | 9/2016 | German |
| 9,890,883 B2 | 2/2018 | Maenishi et al. |
| 10,107,428 B2 | 10/2018 | Kim |
| 10,677,381 B2 | 6/2020 | Furcoiu |
| 10,774,508 B2 | 9/2020 | Furcoiu et al. |
| 10,851,920 B2 | 12/2020 | Showkathali et al. |
| 10,941,887 B2 | 3/2021 | Furcoiu |
| 2002/0017789 A1 | 2/2002 | Holmes |
| 2002/0037194 A1 | 3/2002 | Gentile |
| 2003/0085566 A1 | 5/2003 | Rex et al. |
| 2004/0108713 A1 | 6/2004 | Krausz |
| 2004/0232698 A1 | 11/2004 | Jones |
| 2005/0194784 A1 | 9/2005 | Jones et al. |
| 2005/0253380 A1 | 11/2005 | Gibb et al. |
| 2006/0012172 A1 | 1/2006 | Kennedy, Jr. |
| 2006/0087121 A1 | 4/2006 | Bradley |
| 2007/0108766 A1 | 5/2007 | Riordan et al. |
| 2007/0295406 A1 | 12/2007 | German et al. |
| 2009/0243289 A1 | 10/2009 | Madara et al. |
| 2010/0289256 A1 | 11/2010 | Shumard |
| 2011/0084484 A1 | 4/2011 | German et al. |
| 2011/0095519 A1 | 4/2011 | Krausz |
| 2011/0291409 A1 | 12/2011 | Kennedy, Jr. et al. |
| 2012/0025524 A1 | 2/2012 | Krausz |
| 2012/0119485 A1 | 5/2012 | Cichorek et al. |
| 2012/0299294 A1 | 11/2012 | Chiproot |
| 2012/0299295 A1 | 11/2012 | Chiproot |
| 2013/0056980 A1 | 3/2013 | Chiproot |
| 2013/0328305 A1 | 12/2013 | Chiproot |
| 2014/0001709 A1 | 1/2014 | Chiproot |
| 2014/0319781 A1 | 10/2014 | Chiproot |
| 2014/0319826 A1 | 10/2014 | Chiproot |
| 2015/0176728 A1 | 6/2015 | Bowman |
| 2015/0204468 A1 | 7/2015 | Jones |
| 2017/0030489 A1 | 2/2017 | Decesare et al. |
| 2017/0114933 A1 | 4/2017 | Copeland |
| 2017/0130431 A1 | 5/2017 | Pinney et al. |
| 2018/0306354 A1 | 10/2018 | Furcoiu |
| 2018/0306361 A1 | 10/2018 | Furcoiu |
| 2018/0306362 A1 | 10/2018 | Furcoiu |
| 2019/0017636 A1 | 1/2019 | Furcoiu |
| 2019/0145565 A1 | 5/2019 | Furcoiu |
| 2019/0264843 A1 | 8/2019 | Furcoiu |
| 2019/0331265 A1 | 10/2019 | Bowman |
| 2020/0025321 A1 | 1/2020 | Furcoiu |
| 2020/0063900 A1 | 2/2020 | Furcoiu |
| 2020/0071915 A1 | 3/2020 | Furcoiu et al. |
| 2020/0248847 A1 | 8/2020 | Furcoiu |
| 2020/0263814 A1 | 8/2020 | Furcoiu |
| 2020/0354930 A1 | 11/2020 | Furcoiu et al. |
| 2021/0018125 A1 | 1/2021 | Mitchell et al. |
| 2021/0102647 A1 | 4/2021 | Furcoiu |

FOREIGN PATENT DOCUMENTS

| | | | |
|---|---|---|---|
| CA | 2944828 A1 * | 11/2015 | ............ F16L 21/04 |
| CN | 1894531 | 1/2007 | |
| CN | 202168185 | 3/2012 | |
| DE | 19837803 | 3/2000 | |
| DE | 202016100359 | 3/2016 | |
| EP | 0273999 | 7/1988 | |
| EP | 2463567 | 6/2012 | |
| EP | 2494249 | 9/2012 | |
| GB | 1311434 | 3/1973 | |
| GR | 3030125 | 7/1999 | |
| IL | 196511 | 1/2009 | |
| IL | 196817 | 2/2009 | |
| IL | 209936 | 12/2010 | |
| KR | 101418783 | 7/2014 | |
| KR | 20160082923 | 7/2016 | |
| WO | 2004048835 | 6/2004 | |
| WO | 2011123865 | 10/2011 | |
| WO | 2016108517 | 7/2016 | |
| WO | 2018194787 | 10/2018 | |

(56) References Cited

FOREIGN PATENT DOCUMENTS

| WO | 2019212771 | 11/2019 |
|---|---|---|
| WO | 2020040995 | 2/2020 |
| WO | 2020050954 | 3/2020 |
| WO | 2020146073 | 7/2020 |
| WO | 2021015809 | 1/2021 |

OTHER PUBLICATIONS

Furcoiu, Aurelian Ioan; Office Action for Chinese patent application No. 201880026432.6, file Mar. 21, 2018, dated Nov. 4, 2020, 13 pgs.

Furcoiu, Aurelian Ioan; Notice of Allowance for U.S. Appl. No. 15/649,022, filed Jul. 13, 2017, dated Oct. 1, 2020, 16 pgs.

Furcoiu, Aurelian Ioan; Non-Final Office Action for U.S. Appl. No. 15/966,796, filed Apr. 30, 2018, dated Sep. 3, 2020, 19 pgs.

Furcoiu, Aurelian Ioan; Corrected Notice of Allowance for U.S. Appl. No. 16/121,132, filed Sep. 4, 2018, dated Aug. 12, 2020, 8 pgs.

Furcoiu, Aurelian Ioan; Non-Final Office Action for U.S. Appl. No. 15/490,926, filed Apr. 19, 2017, dated Aug. 14, 2019, 30 pgs.

Furcoiu, Aurelian Ioan; Notice of Allowance for U.S. Appl. No. 15/490,926, filed Apr. 19, 2017, dated Feb. 12, 2020, 15 pgs.

Furcoiu, Aurelian Ioan; Non-Final Office Action for U.S. Appl. No. 15/882,512, filed Jan. 29, 2018, dated Dec. 12, 2019, 42 pgs.

Furcoiu, Aurelian Ioan; International Search Report and Written Opinion for PCT Application No. PCT/US19/46085, filed Aug. 12, 2019, dated Dec. 11, 2019, 13 pgs.

Mitchell, Timothy J.; International Search Report and Written Opinion for PCT Application No. PCT/US19/65337, filed Dec. 10, 2019, dated Feb. 5, 2020, 9 pgs.

Furcoiu, Aurelian Ioan; Non-Final Office Action for U.S. Appl. No. 16/242,059, filed Jan. 8, 2019, dated Nov. 20, 2020, 52 pgs.

Furcoiu, Aurelian Ioan; Corrected Notice of Allowance for U.S. Appl. No. 15/649,022, filed Jul. 13, 2017, dated Jan. 1, 2021, 8 pgs.

Furcoiu, Aurelian Ioan; Corrected Notice of Allowance for U.S. Appl. No. 15/649,022, filed Jul. 13, 2017, dated Nov. 12, 2020, 7 pgs.

Furcoiu, Aurelian Ioan; Corrected Notice of Allowance for U.S. Appl. No. 15/649,022, filed Jul. 13, 2017, dated Nov. 16, 2020, 9 pgs.

Furcoiu, Aurelian Ioan; Notice of Allowance for U.S. Appl. No. 15/649,022, filed Jul. 13, 2017, dated Dec. 9, 2020 3 pgs.

Furcoiu, Aurelian Ioan; Non-Final Office Action for U.S. Appl. No. 15/908,096, filed Feb. 28, 2018, dated Dec. 15, 2020, 23 pgs.

Furcoiu, Aurelian Ioan; Non-Final Office Action for U.S. Appl. No. 16/109,204, filed Aug. 22, 2018, mailed Dec. 22, 2020, 65 pgs.

Furcoiu, Aurelian Ioan; Requirement for Restriction/Election for U.S. Appl. No. 16/109,204, filed Aug. 22, 2018, dated Oct. 27, 2020, 6 pgs.

Furcoiu, Aurelian Ioan; Office Action for European patent application No. 18787054.8, filed Mar. 21, 2018, dated Dec. 22, 2020, 3 pgs.

Furcoiu, Aurelian Ioan; International Preliminary Report on Patentability for PCT Application No. PCT/US19/28339, filed Apr. 19, 2019, dated Nov. 12, 2020, 7 pgs.

Furcoiu, Aurelian Ioan; Requirement for Restriction/Election for U.S. Appl. No. 15/490,926, filed Apr. 19, 2017, dated Jul. 1, 2019, 9 pgs.

Furcoiu, Aurelian Ioan; Requirement for Restriction/Election for U.S. Appl. No. 15/882,512, filed Jan. 29, 2018, dated Jul. 25, 2019, 8 pgs.

Furcoiu, Aurelian Ioan; International Search Report and Written Opinion for PCT Application No. PCT/US19/28339, filed Apr. 19, 2019, dated Jun. 26, 2019, 8 pgs.

Furcoiu, Aurelian Ioan; Supplemental Notice of Allowance for U.S. Appl. No. 15/490,926, filed Apr. 19, 2017, dated Mar. 12, 2020, 9 pgs.

Furcoiu, Aurelian Ioan; Non-Final Office Action for U.S. Appl. No. 15/966,796, filed Apr. 20, 2018, dated Feb. 24, 2020, 40 pgs.

Furcoiu, Aurelian Ioan; Final Office Action for U.S. Appl. No. 16/121,132, filed Sep. 4, 2018, dated Apr. 20, 2020, 17 pgs.

Furcoiu, Aurelian Ioan; International Search Report and Written Opinion for PCT Application Na PCT/US19/65201, filed Dec. 9, 2019, dated Feb. 24, 2020, 10 pgs.

Furcoiu, Aurelian Ioan; Supplemental Notice of Allowance for U.S. Appl. No. 15/490,926, filed Apr. 19, 2017, dated May 14, 2020, 7 pgs.

Furcoiu, Aurelian Ioan; Non-Final Office Action for U.S. Appl. No. 15/882,512, filed Jan. 29, 2018, dated Jun. 26, 2020, 20 pgs.

Furcoiu, Aurelian Ioan; Non-Final Office Action for U.S. Appl. No. 15/649,022, filed Jul. 13, 2017, dated Jun. 25, 2020, 55 pgs.

Furcoiu, Aurelian Ioan; Requirement for Restriction/Election for U.S. Appl. No. 15/649,022, filed Jul. 13, 2017, dated May 19, 2020, 6 pgs.

Furcoiu, Aurelian Ioan; Non-Final Office Action for U.S. Appl. No. 15/908,096, filed Feb. 28, 2018, dated Jun. 18, 2020, 54 pgs.

Furcoiu, Aurelian Ioan; Notice of Allowance for U.S. Appl. No. 16/121,132, filed Sep. 4, 2018, dated Jun. 12, 2020, 9 pgs.

Furcoiu, Aurelian Ioan; International Search Report for PCT Application No. PCT/US18/23554, filed Mar. 21, 2018, dated Jun. 6, 2018, 10 pgs.

Mueller International, LLC; Presentation which includes descriptions and images of known restraint devices. The restraint devices were publicly available prior to Apr. 19, 2017, 39 pgs.

Furcoiu, Aurelian Ioan; Requirement for Restriction/Election for U.S. Appl. No. 15/966,796, filed Apr. 30, 2018, dated Sep. 27, 2019, 8 pgs.

Furcoiu, Aurelian Ioan; Non-Final Office Action for U.S. Appl. No. 16/121,132, filed Sep. 4, 2018, dated Nov. 12, 2019, 31 pgs.

Furcoiu, Aurelian Ioan; International Preliminary Report on Patentability for PCT Application No. PCT/US18/23554, filed Mar. 21, 2018, dated Oct. 31, 2019, 8 pgs.

Furcoiu, Aurelian Ioan; Invitation to Pay Additional Fees for PCT/US19/46085, filed Aug. 12, 2019, dated Oct. 9, 2019, 2 pgs.

Furcoiu, Aurelian Ioan; International Search Report and Written Opinion for PCT Application No. PCT/US19/45453, filed Aug. 7, 2019, dated Oct. 28, 2019, 9 pgs.

Furcoiu, Aurelian Ioan; Non-Final Office Action for U.S. Appl. No. 16/575,013, filed Sep. 18, 2019, dated Mar. 10, 2021, 55 pgs.

Furcoiu, Aurelian Ioan; Corrected Notice of Allowance for U.S. Appl. No. 15/649,022, filed Jul. 13, 2017, dated Feb. 3, 2021, 7 pgs.

Furcoiu, Aurelian Ioan; Notice of Allowance for U.S. Appl. No. 15/966,796, filed Apr. 30, 2018, dated Mar. 26, 2021, 26 pgs.

Furcoiu, Aurelian Ioan; International Preliminary Report on Patentability for PCT Application No. PCT/US19/46085, filed Aug. 12, 2019, dated Mar. 18, 2021, 10 pgs.

Furcoiu, Aurelian Ioan; International Preliminary Report on Patentability for PCT Application No. PCT/US19/45453, filed Aug. 7, 2019, dated Mar. 4, 2021, 8 pgs.

Furcoiu, Aurelian Ioan; Notice of Allowance for U.S. Appl. No. 15/882,512, filed Jan. 29, 2018, dated May 24, 2021, 23 pgs.

Furcoiu, Aurelian Ioan; Final Office Action for U.S. Appl. No. 16/575,013, filed Sep. 18, 2019, dated Jun. 17, 2021, 15 pgs.

Furcoiu, Aurelian Ioan; Final Office Action for U.S. Appl. No. 16/242,059, filed Jan. 8, 2019, dated Jun. 11, 2021, 24 pgs.

Furcoiu, Aurelian Ioan; Final Office Action for U.S. Appl. No. 15/908,096, filed Feb. 28, 2018, dated May 26, 2021, 22 pgs.

Furcoiu, Aurelian Ioan; Supplemental Notice of Allowance for U.S. Appl. No. 15/966,796, filed Apr. 30, 2018, dated May 19, 2021, 6 pgs.

Furcoiu, Aurelian Ioan; Supplemental Notice of Allowance for U.S. Appl. No. 15/966,796, filed Apr. 30, 2018, dated Aug. 3, 2021, 7 pgs.

Furcoiu, Aurelian Ioan; Final Office Action for U.S. Appl. No. 16/109,204, filed Aug. 22, 2018, dated Jun. 14, 2021, 22 pgs.

Furcoiu, Aurelian Ioan; International Preliminary Report on Patentability for PCT Application No. PCT/US19/65201, filed Dec. 9, 2019, dated Jul. 22, 2021, 9 pgs.

(56) References Cited

OTHER PUBLICATIONS

Furcoiu, Aurelian Ioan; Office Action for Chinese patent application No. 201880026432.6, file Mar. 21, 2018, dated May 28, 2021, 18 pgs.
Furcoiu, Aurelian Ioan; Non-Final Office Action for U.S. Appl. No. 16/854,369, filed Apr. 21, 2020, dated Sep. 22, 2021, 51 pgs.
Furcoiu, Aurelian Ioan; Supplemental Notice of Allowance for U.S. Appl. No. 15/882,512, filed Jan. 29, 2018, dated Sep. 1, 2021, 11 pgs.
Furcoiu, Aurelian Ioan; Notice of Allowance for U.S. Appl. No. 16/242,059, filed Jan. 8, 2019, dated Aug. 13, 2021, 18 pgs.
Furcoiu, Aurelian Ioan; Supplemental Notice of Allowance for U.S. Appl. No. 16/242,059, filed Jan. 8, 2019, dated Sep. 1, 2021, 7 pgs.
Furcoiu, Aurelian Ioan; Notice of Allowance for U.S. Appl. No. 15/908,096, filed Feb. 28, 2018, dated Aug. 16, 2021, 12 pgs.
Furcoiu, Aurelian Ioan; Advisory Action for U.S. Appl. No. 16/109,204, filed Aug. 22, 2018, dated Aug. 19, 2021, 10 pgs.
Furcoiu, Aurelian Ioan; Non-Final Office Action for U.S. Appl. No. 16/109,204, filed Aug. 22, 2018, dated Sep. 23, 2021, 19 pgs.
Furcoiu, Aurelian Ioan; Extended European Search Report for patent application No. 18787054.8, filed Mar. 21, 2018, dated Mar. 17, 2021 (received by European counsel for Applicant on Aug. 20, 2021), 9 pgs.

* cited by examiner

GLAND ASSEMBLY

TECHNICAL FIELD

This disclosure relates to pipe connections. More specifically, this disclosure relates to a gland assembly for a mechanical joint pipe connection.

BACKGROUND

Mechanical joint pipe connections are a common method for attaching a pipe length to a piping element such as a valve, a coupling, or a fitting, such as a tee or elbow, or another pipe. The mechanical joint pipe connection can comprise a female socket, a gland, a gasket, and a pipe length. The piping element commonly defines a female socket configured to receive a plain end of the pipe length and a gasket. A gland is commonly provided which slips over the plain end of the pipe length, and the gland is tightened by a series of bolts, which draw the gland towards the female socket, thereby compressing the gasket. Compression of the gasket causes the gasket to engage an outer surface of the plain end of the pipe length, thereby forming a seal between the pipe length and the element.

Mechanical joint pipe connections are popular because mechanical joint pipe connections function with the plain end of the pipe length, unlike groove connections or flanged connections that require preparation of the plain end of the pipe length. The ability to function with the plain end allows for the pipe length to be cut to size in a field installation without requiring the time and field equipment necessary to weld a flange to the plain end or to cut a new groove in the plain end. Mechanical joint pipe connections can be assembled quickly with common hand tools such as a wrench or ratchet.

However, typical mechanical joint pipe connections do not provide for a positive retention mechanism other than friction of the gasket acting on the plain end of the length. The lack of a positive retention mechanism can compromise the seal or lead to the plain end pulling out of the female socket when the connection is subjected to high tension force or effects such as water hammer. Some mechanical joint pipe connections can incorporate a joint restraint mechanism configured to mechanically engage the plain end of the pipe; however, existing joint restraint mechanisms can exert high stresses upon the plain end of the pipe length, which can lead to deformation, creep, and cracking of the plain end of the pipe length during installation or operation. Deformation, creep, and cracking can lead to failure of the seal or failure of the pipe length itself which can result in leaks or environmental contamination The gland is typically manufactured by casting, such as sand casting. Often, a core must be used in the casting process to aid in producing internal cavities and/or reentrant angles. Cores can be expensive to produce/source, and thus can increase the cost of manufacturing the gland. Additional drawbacks of requiring the use of a core in the manufacturing process can include requiring a large amount of material to produce the gland. Cores also have a limited lifespan, can be broken by improper handling or during transportation, and can require cleaning any tight pockets or corners of the core.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a gland assembly comprising a gland, the gland defining a gland bore; a joint restraint assembly comprising; a restraint base formed on the gland; a gripper disposed within the restraint base; and a spring comprising a retention tab and an engagement leg, the engagement leg configured to engage the gripper; and a gasket defining a recess, the retention tab configured to engage the recess.

Also disclosed is a mechanical joint comprising a piping element defining a first flange and a socket, the socket formed proximate the first flange; a pipe extending into the socket and defining an outer surface; and a gland assembly comprising; a gland defining a gland bore, the pipe extending through the gland bore; a joint restraint assembly comprising a gripper and a spring, the gripper configured to engage the outer surface of the pipe, the spring configured to bias the gripper towards engagement with the outer surface of the pipe; and a gasket defining a recess, the spring configured to engage the recess.

Also disclosed is a method for using a gland assembly comprising sliding a gland assembly over an end of a pipe, the pipe defining an outer surface, the gland assembly comprising a gland, a joint restraint assembly, and a gasket, the joint restraint assembly comprising a gripper and a spring, the spring configured to engage the gripper and the gasket; inserting the end of the pipe into a socket of a piping element; fastening the gland to the piping element; and disabling a deactivation mechanism of the joint restraint assembly; engaging the joint restraint assembly with the outer surface of the pipe to prevent removal of the pipe from the piping element.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
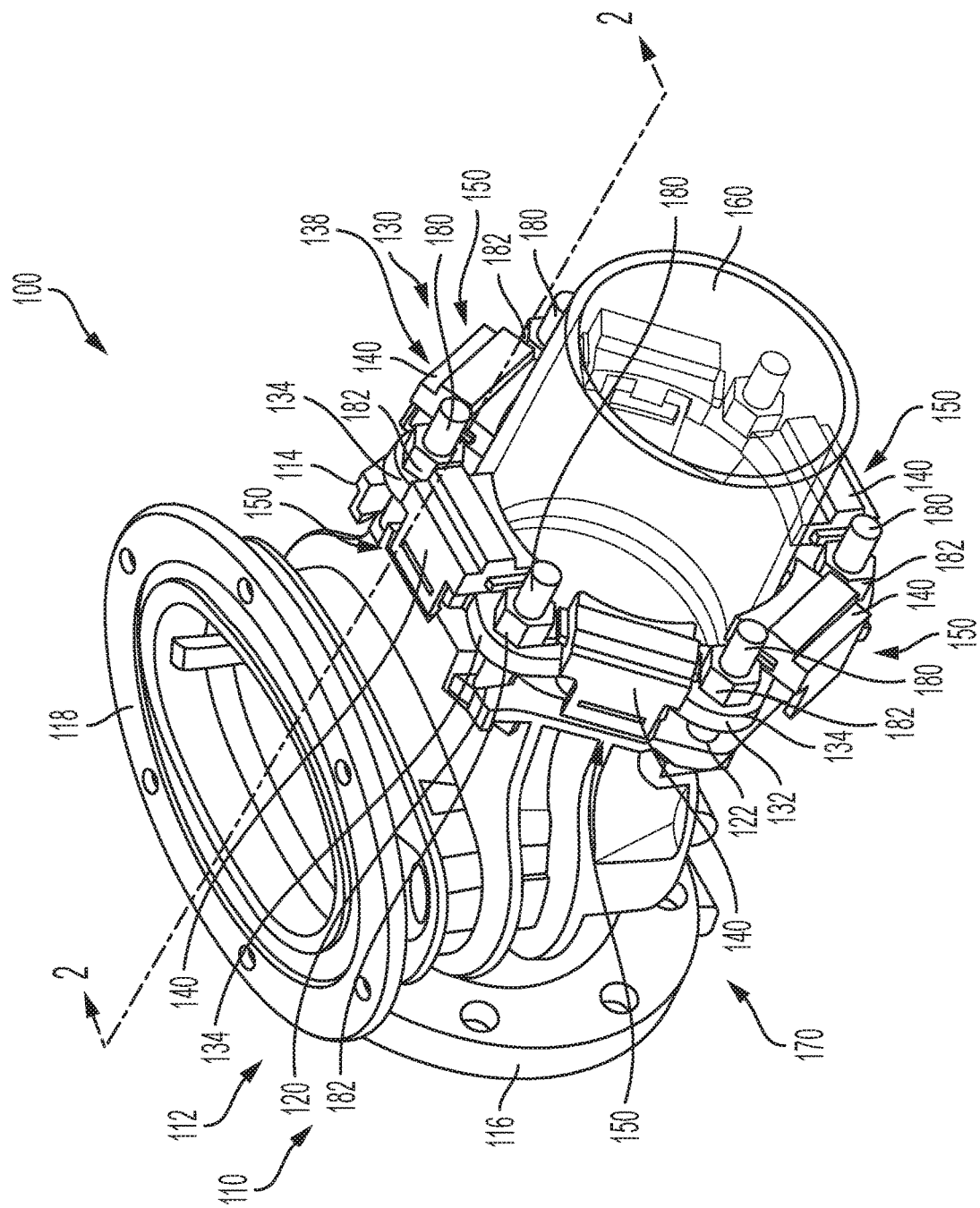
FIG. 1 is a top perspective view of a mechanical joint comprising a flange, a gland assembly, and a pipe, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a gland assembly and associated methods, systems, devices, and various apparatus. Example aspects of the gland assembly can comprise an annular gland, a gasket, and one or more joint restraint assemblies for engaging a pipe. It would be understood by one of skill in the art that the disclosed gland assembly is described in but a few exemplary aspects among many. No particular terminology or description should be considered limiting on the disclosure or the scope of any claims issuing therefrom.

FIG. 1 illustrates a perspective view of a piping element assembly 100, according to an example aspect of the present disclosure. The piping element assembly 100 can comprise a piping element 110, a gland assembly 130, and a pipe 160. The pipe 160 is shown as relatively short in length and transparent for exemplary purposes and can be non-transparent and significantly longer than shown in other aspects. In application, the pipe 160 can be part of a piping system or a piping infrastructure, such as, for example, a municipal water infrastructure or any other suitable piping system or piping infrastructure.

In the present aspect, the piping element 110 can be fitting, such as a gate valve 112, as shown. Other aspects of the piping element 110 can be another fitting, such as a tee, an elbow, a reducer, a wye, a shaped fitting, or any other suitable type of pipe fitting. In other aspects, the piping element 110 can be another type of valve, such as, for example, a ball valve, a butterfly valve, a globe valve, or any other suitable type of valve. According to still other aspects, the piping element 110 can be a coupling configured to mechanically couple and seal the pipe 160 with a second pipe (not shown) in fluid communication. Other aspects of the piping element 110 can be equipment, such as, for example, a fire hydrant.

As shown, in the present aspect, the piping element 110 can comprise a first flange 114 and a second flange 116 disposed substantially opposite from the first flange 114. The gland assembly 130 can be connected to the first flange 114, and together the first flange 114, gland assembly 130, and pipe 160 can define a mechanical joint 170. The mechanical joint 170 can be configured to mechanically couple and seal the pipe 160 to the piping element 110 to allow for fluid flow therebetween. In some aspects, a second gland assembly (not shown) can be connected to the second flange 116 and a second pipe (not shown) to define a second mechanical joint (not shown). As shown, example aspects of the piping element 110 can comprise a third flange 118 for connecting the piping element 110 to a valve, another fitting, or the like.

The gland assembly 130 can be coupled to the first flange 114 by one or more fasteners 180. In example aspects, as illustrated, the fasteners 180 can be T-bolts; however in other aspects, the fasteners 180 can be bolts, screws, studs, adhesives or any other suitable type of fastener. Each of the fasteners 180 can engage a flange slot 120 or a flange hole 122 defined in the first flange 114. Each of the fasteners 180 further can engage a gland hole 336 (shown in FIG. 3A) defined in a fastener pad 134 of the gland assembly 130. In example aspects, a nut 182 can be tightened onto each of the fasteners 180 to draw the gland assembly 130 towards the first flange 114 and to secure the gland assembly 130 to the first flange 114.

The gland assembly 130 of the present aspect can comprise a generally annular gland 132 and one or more joint restraint assemblies 150. For example, as shown, the gland assembly 130 can comprise six joint restraint assemblies 150 substantially equally spaced about a circumference of the annular gland 132. A fastener pad 134 can be positioned between each of the joint restraint assemblies 150. In other aspects, the gland assembly 130 can comprise more or fewer joint restraint assemblies 150 and fastener pads 134. Moreover, in other aspects, the joint restraint assemblies 150 and fastener pads 134 may not be equally spaced about the circumference of the annular gland 132 and can be positioned in any other suitable arrangement.

Figure 2:
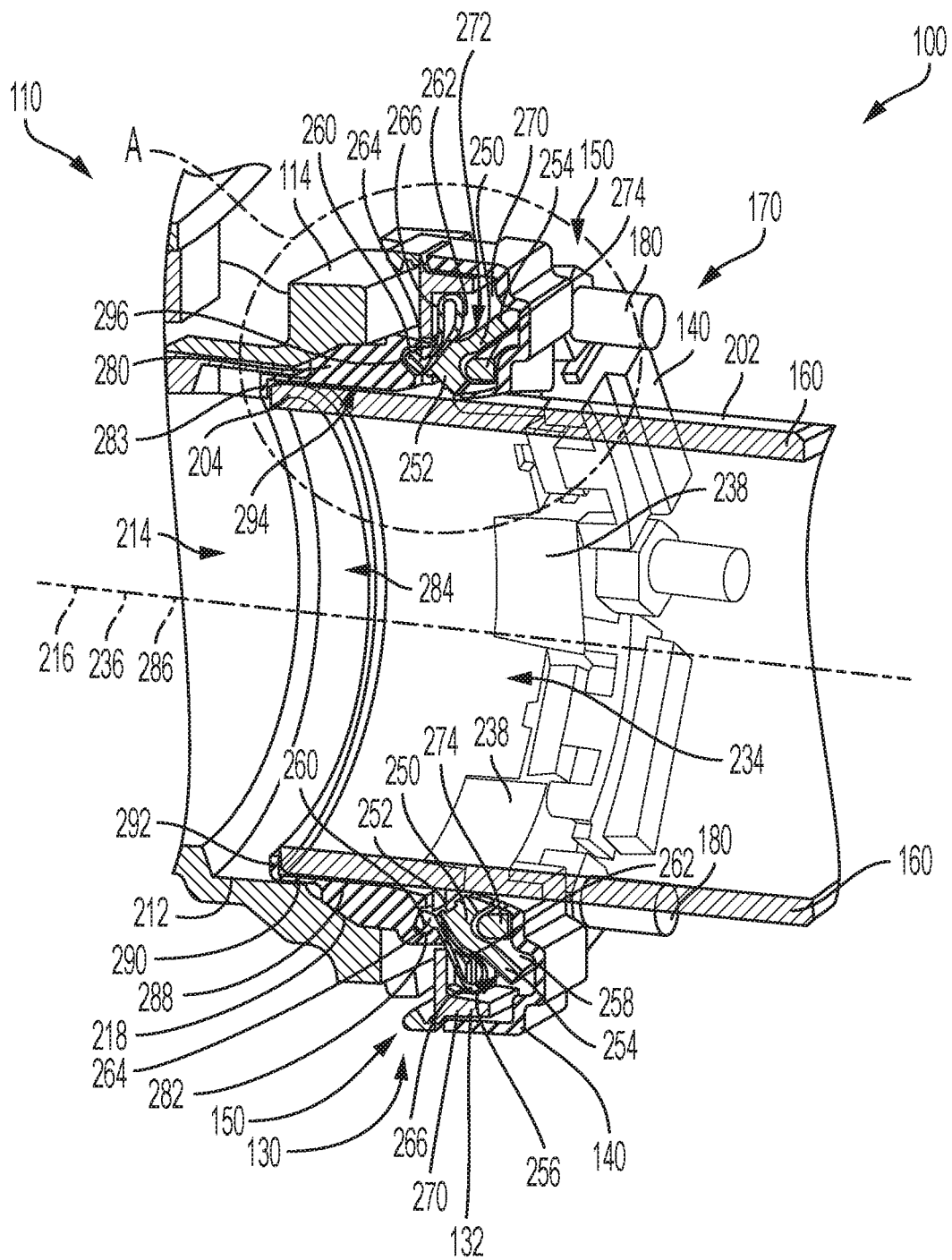
FIG. 2 is a cross-sectional view of the mechanical joint of FIG. 1 taken along line 2-2 in FIG. 1, wherein the mechanism joint comprises a joint restraint assembly.

Example aspects of the joint restraint assemblies 150 can be positionable in an activated configuration, as shown in FIG. 1, and a deactivated configuration, as shown in FIG. 2. In the activated configuration, each of the joint restraint assemblies 150 of the gland assembly 130 can engage the pipe 160 in order to prevent removal of the pipe 160 from the piping element 110 and gland assembly 130. In the deactivated configuration, each of the joint restraint assemblies 150 can be prevented from engaging the pipe 160. According to example aspects, the gland assembly 130 can comprise a deactivation mechanism 138 for preventing the joint restraint assembly 150 from engaging the pipe 160. The deactivation mechanism 138 can be, for example, one or more restraint covers 140, as shown. In other aspects, the deactivation mechanism 138 can be an O-ring, rubber band, bungee cord, or any other suitable elastic or mechanical member. The deactivation mechanism 138 is described in further detail below with reference to FIGS. 6A and 6B. The activated configuration and deactivated configuration of the joint restraint assemblies 150 are described in further detail below with reference to FIGS. 7 and 8.

FIG. 2 is a cross sectional view of the piping element assembly 100 taken across line 2-2 in FIG. 1. As shown, the piping element 110 can define a socket 212 sized to accept the pipe 160 within the first flange 114. The piping element 110 can further define a piping element bore 214 extending through the piping element 110 from the first flange 114 to the second flange 116 (shown in FIG. 1). In the present aspect, the piping element bore 214 can be substantially cylindrical and can define a piping element bore axis 216 therethrough. In other aspects, the piping element bore 214 can be curved or angled—for example, in aspects in which the piping element 110 is an angled fitting (e.g., an elbow fitting). In still other aspects, the piping element bore 214 can be forked or defined by multiple bores intersecting each other.

The annular gland 132 of the gland assembly 130 can define a gland bore 234, and the gland bore 234 can define a gland bore axis 236, as shown. Example aspects of the gland bore axis 236 can be substantially aligned with the piping element bore axis 216, such that gland bore 234 and piping element bore 214 can be substantially coaxial. According to example aspects, the pipe 160 can extend through the gland bore 234 and into the socket 212 of the piping element 110. As shown, the pipe 160 can be substantially coaxial with the gland bore axis 236 and the piping element bore axis 216.

The gland assembly 130 of the piping element assembly 100 can further comprise a gasket 280. In the present aspect, the gasket 280 can be disposed substantially axially between the socket 212 of the piping element 110 and the annular gland 132 of the gland assembly 130, relative to the piping element bore axis 216. The gasket 280 can be configured to seal against an outer surface 202 of the pipe 160. In example aspects, the gasket 280 can comprise an elastic and resilient material, such as, for example, an elastomer, polymer, rubber, or any other suitable material known in the art. Furthermore, the gasket 280 can define a gasket bore 284, and the gasket bore 284 can define a gasket bore axis 286 that can be substantially co-linear with the piping element bore axis 216 and the gland bore axis 236, such that gland bore 234, gasket bore 284, and piping element bore 214 can define a common axis.

As shown, the piping element 110 can define a gasket groove 218 adjacent the socket 212 for engaging the gasket 280. In example aspects, the gasket groove 218 can define a taper, and the gasket groove 218 can define a substantially triangular or trapezoidal profile. The gasket groove 218 can be shaped to receive a central portion 288 of the gasket 280, as illustrated. The annular gland 132 can also be configured to engage the gasket 280. According to example aspects, the gasket 280 can define one or more gasket engagement surfaces 482 (shown in FIG. 4A) at a first end 282 of the gasket 280. The gasket engagement surfaces 482 can be configured to engage corresponding gland ribs 238 on the annular gland 132 to secure the gasket 280 to the annular gland 132. In some aspects, the gasket 280 can be stretched over the gland ribs 238, such that the gasket 280 is secured to the annular gland 132 by a friction force. In other aspects, the gasket engagement surfaces 482 can be secured to the gland ribs 238 by a fastener, such as with a glue, adhesive, mastic, epoxy, tape, or any other suitable fastening mechanism, such as a mechanical fastener. With the gasket 280 retained on the annular gland 132, the gland assembly 130 can be handled as a single unit, which can aid in the assembly of the mechanical joint 170, as described in further detail below.

The gasket 280 can further comprise a pipe collar 290 generally at a second end 283 of the gasket 280. Example aspects of the pipe collar 290 can be configured to extend into the socket 212 of the piping element 110. As illustrated, the pipe collar 290 can define a stop lip 292 that can be configured to interfere with a pipe end 204 of the pipe 160 to act as a positive stop. The stop lip 292 can extend radially inward relative to the gasket bore axis 286. The stop lip 292 can limit the insertion of the pipe end 204 into the gland bore 234, thereby ensuring correct positioning of the gland assembly 130 on the pipe 160.

In example aspects, the gasket 280 can be compressed in the gasket groove 218 of the piping element 110 as the fasteners 180 are tightened to draw the gland assembly 130 towards the first flange 114. Compression of the gasket 280 can press an inner surface 294 of the pipe collar 290 against the outer surface 202 of the pipe 160, thereby energizing the gasket 280 and creating a seal between the gasket 280 and the pipe 160. With the gasket 280 compressed, friction between the inner surface and the outer surface 202 of the pipe 160 can resist movement of the pipe 160 in the axial direction, relative to the gasket bore axis 286.

According to example aspects, each of the joint restraint assemblies 150 can comprise a gripper 250 and a spring element, such as, for example, a spring clip 260. Each joint restraint assembly 150 can be assembled on a restraint base 270 of the annular gland 132. According to example aspects, each of the restraint bases 270 can be oriented between a pair of adjacent fastener pads 134 (shown in FIG. 1). In the present aspect, each restraint base 270 can be monolithically formed with the annular gland 132; however, in other aspects, the restraint base 270 can be a separate component, which can be attached or fastened to the annular gland 132. In some aspects, a position of the restraint base 270 on the annular gland 132 can be adjusted, such as by moving the restraint base 270 radially inward or outward relative to the gland bore axis 236. Such adjustment can allow the gland assembly 130 to be configured for pipes defining different outer diameters. In some aspects, the restraint bases 270 can also be adjusted on the annular gland 132 axially relative to the gland bore axis 236.

Example aspects of the restraint base 270 can define a restraint pocket 272 and a restraint pivot 274. The gripper 250 and the spring clip 260 can be disposed within the restraint pocket 272, and the spring clip 260 can bias the gripper 250 in an engagement direction against the restraint pivot 274. According to example aspects, the restraint cover 140 can be configured to substantially cover the restraint base 270, which can help isolate the gripper 250 and spring clip 260 from external elements, such as dirt, various fluids, and debris, which can compromise the functioning of the joint restraint assembly 150. The restraint cover 140 can also help prevent undesired tampering with the joint restraint assembly 150.

The spring clip 260 can bias a front wall 258 of the gripper 250 into engagement with the restraint pivot 274, as shown. Example aspects of the spring clip 260 can define an engagement leg 262, a retention leg 266, and a retention tab 264. As shown, the engagement leg 262 and retention leg 266 can generally define a V-shape, and the retention tab 264 can be oriented at a distal end of the retention leg 266. Example aspects of the gripper 250 can define an engagement end 252 and a lever end 254. The engagement leg 262 of the spring clip 260 can press against a rear wall 256 of the gripper 250 proximate to the engagement end 252 to bias the engagement end 252 of the gripper 250 in an engagement direction towards the outer surface 202 of the pipe 160. The retention tab 264 of the spring clip 260 can engage a tab recess 296 formed in the gasket 280, as shown. As described above, the gasket 280 can be secured to the annular gland 132 by a friction force and/or a fastener, and as such, the engagement of the retention tab 264 with the tab recess 296 of the gasket 280 can position and secure the spring clip 260 within the restraint pocket 272. The spring clip 260 can thereby maintain the engagement between the gripper 250 and the restraint pivot 274.

Figure 3A:
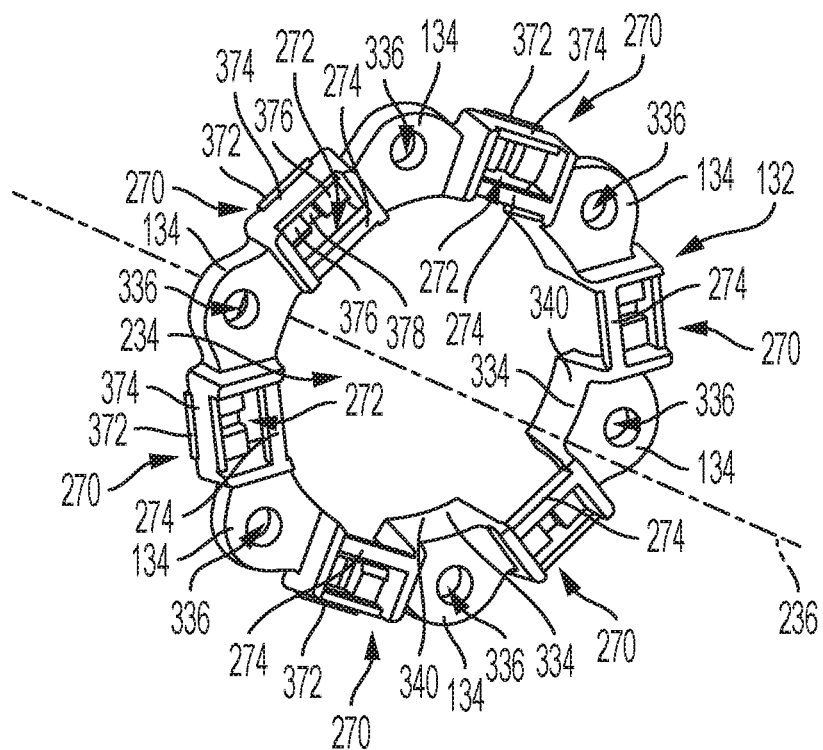
FIG. 3A a front perspective view of a gland of the gland assembly of FIG. 1.
Figure 3B:
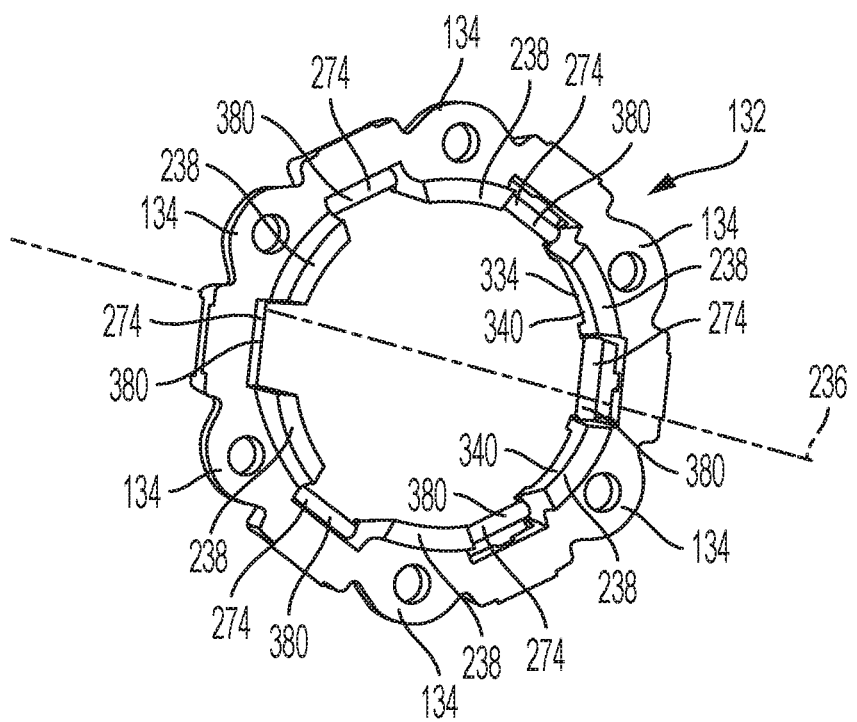
FIG. 3B is a rear perspective view of the gland of FIG. 3A.

FIGS. 3A and 3B illustrate an example aspect of the annular gland 132. According to example aspects, the annular gland 132 can comprise cast iron, such as ductile iron. In other aspects, the annular gland 132 can comprise another metal material, such as cast steel, or any other suitable material known in the art. In example aspects, the process for casting the annular gland 132 can include, but is not limited to, sand casting, DISA casting, investment casting, and machining on a five-axis machine. In aspects comprising sand casting, the sand casting can be performed with regular sand molds or 3D-printed molds. Referring to FIG. 3A, as shown, the annular gland 132 can define the fastener pads 134 and the restraint bases 270 substantially equally spaced about the circumference of the annular gland 132. As shown, each of the restraint bases 270 can comprise a deactivation lip 372 extending radially outward from an outer surface 374 of the restraint base 270, relative to the gland bore axis 236. A stop surface 376 can be defined within each of the restraint pockets 272 of the restraint bases 270, and a spring groove 378 can be defined on each of the stop surfaces 376. In example aspects, at least a portion of the retention leg 266 of the spring clip 260 (shown in FIG. 2) can contact the spring groove 378. The restraint pivot 274 of each restraint base 270 can be disposed generally opposite the corresponding stop surface 376 to generally define the restraint pocket 272 therebetween. As shown, each of the restraint pivots 274 can be oriented proximate the gland bore 234.

Referring to FIG. 3B, the restraint pivot 274 can define a restraint bearing surface 380 generally facing toward the restraint pocket 272 (shown in FIG. 3A). In the present aspect, the restraint bearing surface 380 can define a curved surface; however, in other aspects, the restraint bearing surface 380 can be differently shaped. Example aspects of the restraint bearing surface 380 can be configured to engage a gripper bearing surface 552 (shown in FIG. 5) formed on the front wall 258 of the gripper 250 (shown in FIG. 2). In some aspects, the restraint pivots 274 can be manufactured separately from the annular gland 132 for ease of manufacturing. Also, in some aspects, the restraint pivots 274 can comprise a different material from the annular gland 132. For example, the annular gland 132 can comprise cast iron, such as ductile iron, and the restraint pivots 274 can comprise a material such as bronze, which can demonstrate desirable bearing properties such as high hardness values and low friction coefficients.

As also shown in FIG. 3B, each of the gland ribs 238 can extend axially from a rear surface 334 of one of the fastener pads 134, relative to the gland bore axis 236, and as such, each of the gland ribs 238 can be equally spaced about the annular gland 132. Each of the gland ribs 238 can define a rib engagement surface 340 (also shown in FIG. 3A) configured to engage a corresponding gasket engagement surface 482 (shown in FIG. 4A).

According to example aspects, the annular gland 132 can be manufactured by casting, such as, for example, sand casting. In the present aspect, the annular gland 132 can be formed using a multi-piece mold, without the need for a core to form the restraint pockets 272. For example, the multi-piece mold can be a two-piece mold. The core-less manufacturing process can provide various benefits, including reduced manufacturing costs, including the elimination of costs associated with manufacturing, purchasing, and/or cleaning a core, and costs associated with scrap material.

Figure 4A:
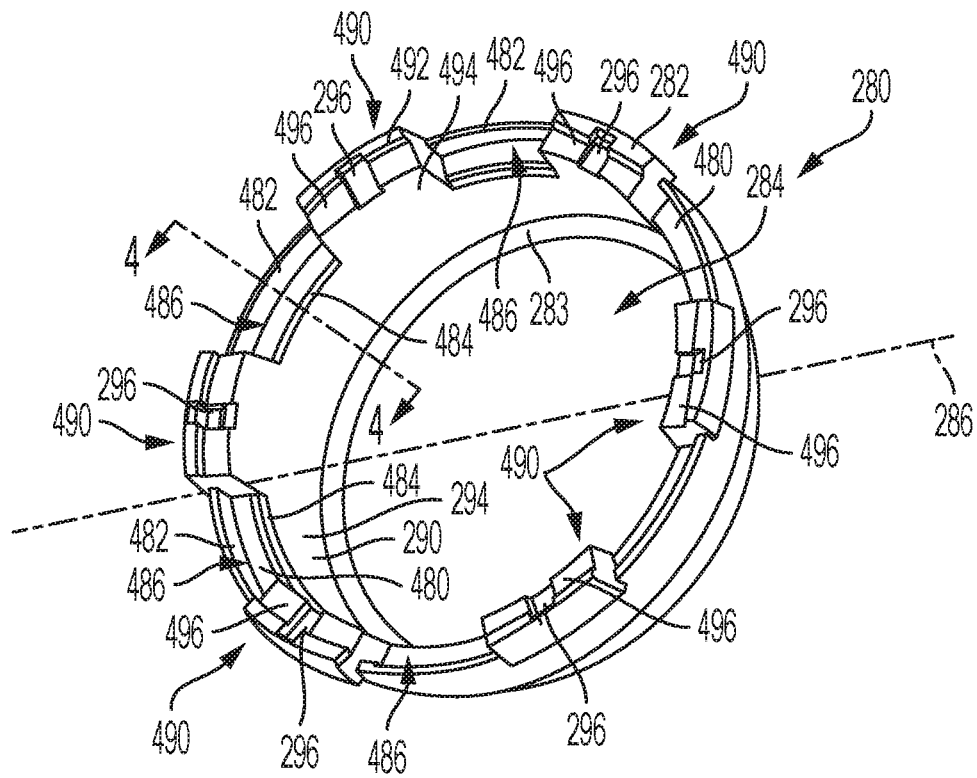
FIG. 4A is a bottom perspective view of a gasket of the gland assembly of FIG. 1.
Figure 4B:
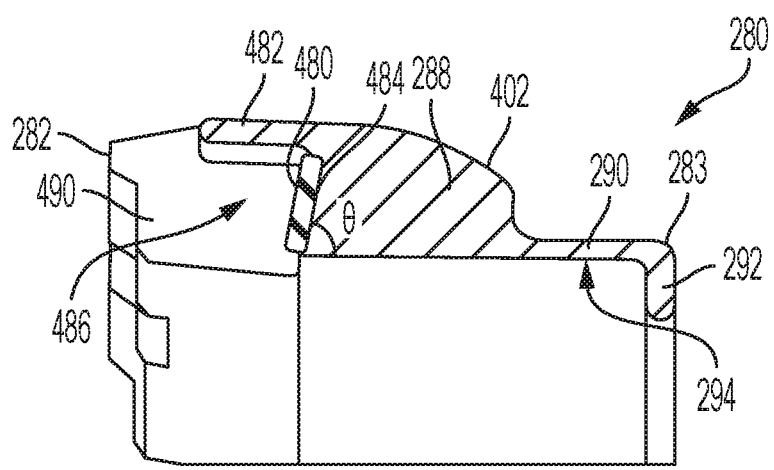
FIG. 4B is a cross-sectional view of the gasket of FIG. 4A taken along line 4-4 in FIG. 4B.

FIGS. 4A and 4B illustrate an example aspect of the gasket 280. As shown in FIG. 4A, the inner surface 294 of the pipe collar 290 of the gasket 280 can generally define the gasket bore 284. The gasket 280 can further define the first end 282 and the opposite second end 283. The gasket 280 can define a plurality of retention blocks 490, which can be equally spaced about the circumference of the gasket 280 between the gasket engagement surfaces 482. Each of the retention blocks 490 can be formed at the first end 282 of the gasket 280, and in some aspects, can extend axially beyond the first end 282 of the gasket, as shown. Each retention block 490 can define one of the tab recesses 296 for receiving a retention tab 264 of a corresponding spring clip 260 (shown in FIG. 2). In some aspects, the retention blocks 490 can each define a step 496 between a radially outer portion 492 of the retention block 490 and a radially inner portion 494 of the retention block 490, such that the radially outer portion 492 extends axially beyond the radially inner portion 494, relative to the gasket bore axis 286.

Example aspects of the gasket engagement surfaces 482 can be formed axially between the first end 282 and second end 483 of the gasket 280. In example aspects, the gasket engagement surfaces 482 can be equally spaced about a circumference of the gasket 280 and can face radially inward, relative to the gasket bore axis 286. The positioning of the gasket engagement surfaces 482 can generally correlate to the positioning of the rib engagement surfaces 340 (shown in FIG. 3B) of the annular gland 132 (shown in FIG. 3B). In example aspects, as shown, a gasket shoulder 484 can extend radially between the inner surface 294 of the pipe collar 290 and each of the gasket engagement surfaces 482, relative to the gasket bore axis 286. Together, the gasket engagement surface 482 and corresponding gasket shoulder 484 can define a gland rib pocket 486 configured to receive a corresponding gland rib 238 (shown in FIG. 2).

In some aspects, the gasket 280 can comprise a stiffening ring 480. In the present aspect, the stiffening ring 480 can extend through a channel (not shown) formed in each of the retention blocks 490 and can engage the gasket shoulders 484, as shown. The stiffening ring 480 can provide a uniform stiffness to the gasket 280, such that the gasket 280 can be uniformly compressed in the gasket groove 218 (shown in FIG. 2) of the piping element 110 (shown in FIG. 1) as the fasteners 180 (shown in FIG. 1) are tightened to draw the gland assembly 130 (shown in FIG. 1) towards the first flange 114 (shown in FIG. 1), as described above. Specifically, in example aspects, an abutment end of the gland ribs 238 can apply a force to the portions of the stiffening ring 480 received on the gasket shoulders 484 as the fasteners 180 are tightened, and the stiffening ring 480 can uniformly and annularly distribute the force to the central portion 288 (shown in FIG. 2) of the gasket 280.

FIG. 4B illustrates a cross-sectional view of the gasket 280 taken along line 4-4 in FIG. 4A. As shown, the stop lip 292 of the gasket 280 can be formed at the second end 283 of the gasket 280 and can extending radially inward from the inner surface 294 of the pipe collar 290. The pipe collar 290 can extend axially from the stop lip 292 towards the first end 282 of the gasket 280, relative to the gasket bore axis 286 (shown in FIG. 4A). As shown, in some example aspects, each of the gasket shoulders 484 can be oriented at an acute angle θ relative to the inner surface 294 of the pipe collar 290. Further, as shown, the central portion 288 of the gasket 280 can define a taper on an outer surface 402 of the gasket 280. The tapered outer surface 402 of the central portion 288 can be configured to engage the tapered gasket groove 218 (shown in FIG. 2) of the piping element 110 (shown in FIG. 1).

Figure 5:
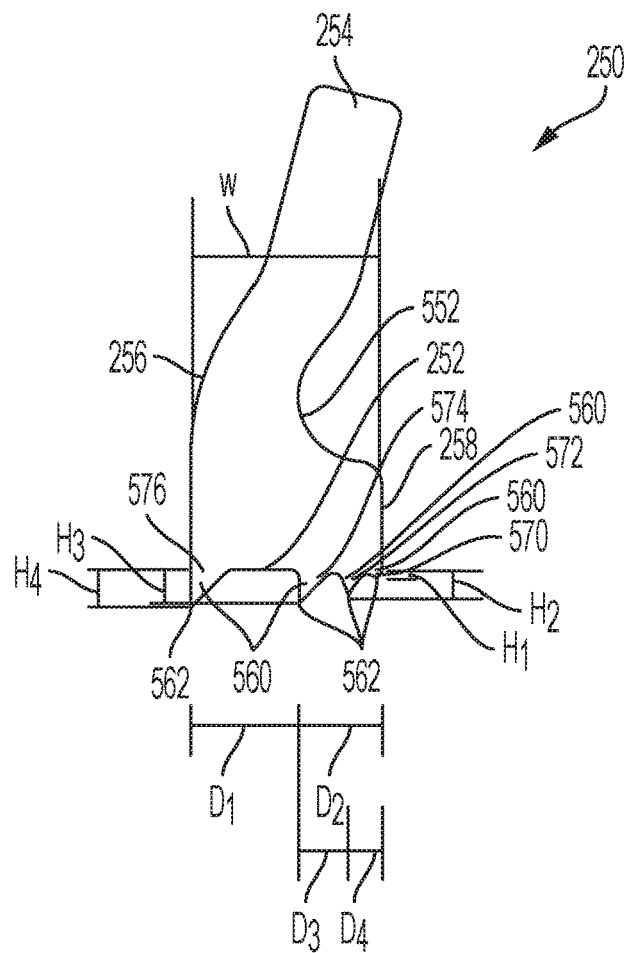
FIG. 5 is a side view of a gripper of the joint restraint assembly of FIG. 2.
Figure 7:
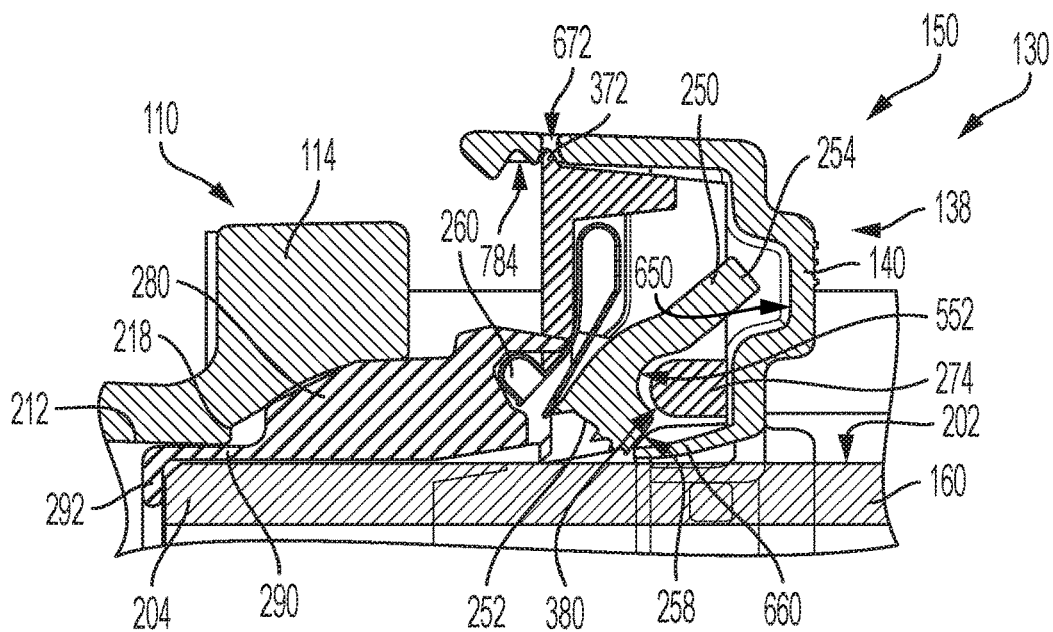
FIG. 7 is a detail view of Section A of FIG. 2, wherein the joint restraint assembly of FIG. 2 is in a deactivated configuration.
Figure 8:
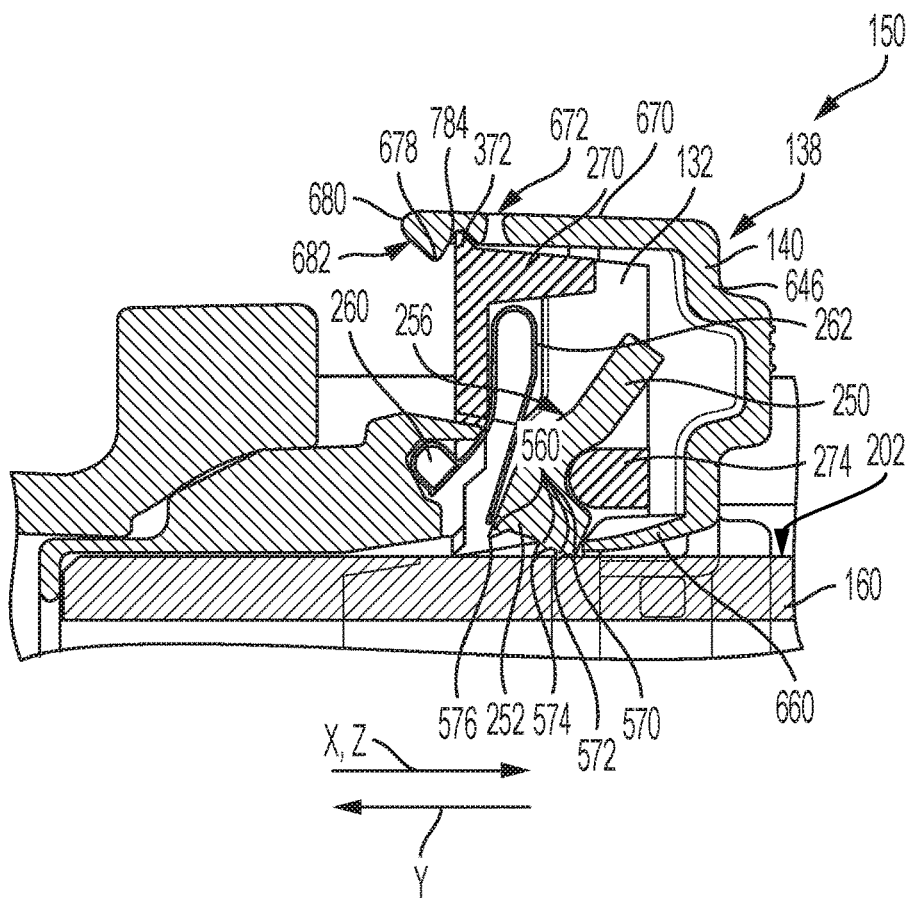
FIG. 8 is a detail view of Section A of FIG. 2, wherein the joint restraint assembly of FIG. 2 is in an activated configuration.

FIG. 5 illustrates an example aspect of the gripper 250. The gripper 250 can define the engagement end 252 and the lever end 254. The engagement end 252 can be disposed opposite from the lever end 254, as shown. The gripper 250 can also define the front wall 258 and rear wall 256. The gripper bearing surface 552 can be defined between the engagement end 252 and the lever end 254 on the front wall 258 of the gripper 250. Example aspects of the gripper bearing surface 552 can define a curve that can be complementary to the curve of the restraint bearing surface 380 (shown in FIG. 3B) to allow for rotational movement of the gripper 250 about the restraint pivot 274 between a disengaged position, as shown in FIG. 7, and an engaged position, as shown in FIG. 8. The gripper 250 can comprise a plurality of gripping protuberances 560 formed at the engagement end 252, as shown. In example aspects, the gripping protuberances 560 can be formed as wedge-shaped rails extending a length of the gripper 250 with ends that descend to an end point 562. The gripper 250 can comprise a leading row 570 of protuberances 560, a second row 572 of protuberances 560, a third row 574 of protuberances 560, and a final, fourth row 576 of protuberances 560.

In some aspects, a height $H_1$ of the leading row 570 of gripper protuberances 560 can be smaller than the second, third, and fourth rows 572,574,576. For example, the height $H_1$ of the leading row 570 can be less than half of a height $H_2$ of the second row 572. The height $H_2$ can be somewhat more than half of a height $H_3$ of the third row 574. In example aspects, a height $H_4$ of the fourth row 576 can be slightly larger than or about the same as the height $H_3$.

The engagement end 252 of the gripper 250 can define a width W, as shown. In the current aspect, a distance $D_1$ between the end point 562 of the fourth row 576 and the end point 562 of the third row 574 can be slightly more than half of the width W. As such, a distance $D_2$ as measured from the end point 562 of the third row 574 to the front wall 258 of the gripper 250 can be less than the distance $D_1$. Furthermore, a distance $D_4$ as measured between the end point 562 of the second row 572 and the end point 562 of the leading row 570 can be slightly less than half of a distance $D_3$ as measured between the end point 562 of the third row 574 and the end point 562 of the leading row 570. As such, in the current aspect, the distance between each of the adjacent rows 570,572,574,576 can become progressively larger when moving from the leading row 570 to the fourth row 576.

In the current aspect, the rows 570,572,574,576 can be linear rails, and the profile view of FIG. 5 can be simply extruded in space to form the gripper 250. However, in various aspects, the rows 570,572,574,576 can be curved to match an anticipated curvature of the pipe 160 (shown in FIG. 1) to facilitate engagement of the gripping protuberances 560 with the outer surface 202 (shown in FIG. 2) of the pipe 160.

Figure 6A:
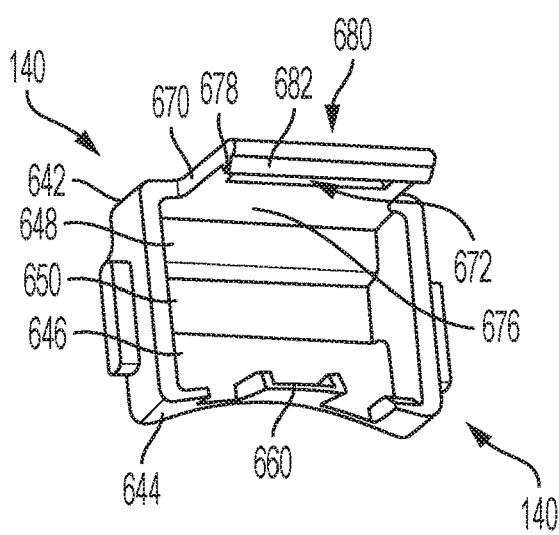
FIG. 6A is a front perspective view of a restraint cover of the joint restraint assembly of FIG. 2.
Figure 6B:
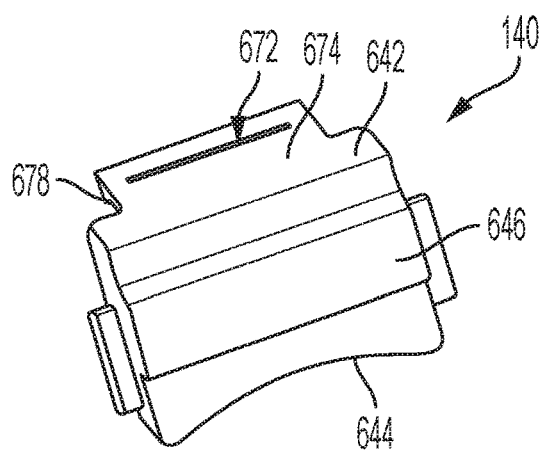
FIG. 6B is a rear perspective view of the restraint cover of FIG. 6A.

FIGS. 6A and 6B illustrate an example aspect of the restraint cover 140. The restraint cover 140 can define a top end 642 and a bottom end 644. A front wall 646 can extend therebetween. According to example aspects, the front wall 646 can define a gripper indent 650. The restraint cover 140 can comprise a stop leg 660 extending from a rear surface 648 of the front wall 646 at the bottom end 644 of the restraint cover 140, as shown. In the current aspect, the stop leg 660 can provide a point of contact between the restraint cover 140 and the gripper 250 (shown in FIG. 2) and can be configured to bias the gripper 250 in a disengagement direction away from the outer surface 202 of the pipe 160. The restraint cover 140 further can define a top ledge 670 extending from the rear surface 648 of the front wall 646 at the top end 642 of the restraint cover 140. A deactivation slot 672 can be formed in the top ledge 670, as shown, and can extend from a top surface 674 of the top ledge 670 to a bottom surface 676 of the top ledge 670. Example aspects of the top ledge 670 can also comprise a stop ridge 678 extending from the bottom surface 676. In some aspects, the top ledge 670 can define an actuation end 680 distal from the front wall 646 of the restraint cover 140. An actuation surface 682 of the actuation end 680 can be formed on the stop ridge 678, as shown. Example aspects of the top ledge 670 can further define an activation channel 784 (shown in FIG. 7). The activation channel 784 of the present aspect can extend into the bottom surface 676 of the top ledge 670 and can be defined between the deactivation slot 672 and the stop ridge 678. The front wall 646, top ledge 670, and stop leg 660 can generally define a restraint recess 690 within which a corresponding restraint base 270 (shown in FIG. 2) can be received, as illustrated in FIG. 7.

In some example aspects, the top ledge 670 can be resiliently connected to front wall 646 of the restraint cover 140, such that the top ledge 670 can be flexed relative to the front wall 646 upon the application of a force and can return to an equilibrium position upon release of the force. For example, a generally upward force can be applied to the actuation surface 682 of the actuation end 680, relative to the orientation shown, to slightly rotate the top ledge 670 upward relative to the front wall 646. The force can be a manual force applied by a user, for example. When the force is released, the top ledge 670 can be naturally biased back to its equilibrium position. As shown, in the present aspect, the top ledge 670 can be substantially perpendicular to the front wall 646 in its equilibrium position.

FIG. 7 illustrates a detailed view of Section A of FIG. 2, showing one of the joint restraint assemblies 150 of the gland assembly 130 in the deactivated configuration. The pipe end 204 of the pipe 160 can be received through the gland bore 234 (shown in FIG. 2) and gasket bore 284 (shown in FIG. 2) of the gland assembly 130. As shown, the gland assembly 130 can be tightened on the first flange 114 of the piping element 110 to compress the gasket 280 in the gasket groove 218 and to seal the gasket 280 with the outer surface 202 of the pipe 160, which can aid in preventing axial movement of the pipe 160, relative to the gasket bore axis 286 (shown in FIG. 2). The stop lip 292 and a portion of the pipe collar 290 of the gasket 280 can extend into the socket 212 of the piping element 110, and the stop lip 292 can prevent the pipe 160 from extending further into the socket 212.

The spring clip 260 can bias the gripper bearing surface 552 into facing contact with the restraint bearing surface 380 and can bias the engagement end 252 of the gripper 250 towards the outer surface 202 of the pipe 160. However, in the deactivated configuration, the deactivation mechanism 138 (e.g., the restraint cover 140) of the gland assembly 130 can retain the gripper 250 in the disengaged position and can prevent contact of the gripper 250 with the outer surface 202 of the pipe 160. For example, in the present aspect, the deactivation lip 372 of the restraint base 270 can engage the deactivation slot 672 of the restraint cover 140. With the deactivation lip 372 engaging the deactivation slot 672, the stop leg 660 of the restraint cover 140 can be pressed against the front wall 258 of the gripper 250 proximate the engagement end 252 to provide mechanical resistance against the spring force of the spring clip 260, such that the gripper 250 can be rotated about the restraint pivot 274 in the disengagement direction away from contact with the outer surface 202 of the pipe 160. In other aspects, the restraint cover 140 can engage the lever end 254 of the gripper 250 to rotate the gripper 250 away from contact with the outer surface 202. As shown in the present aspect, the lever end 254 of the gripper 250 can be received or partially received in the gripper indent 650 of the restraint cover 140 when the gripper 250 is in the disengaged position.

FIG. 8 illustrates a detailed view of Section A of FIG. 2, showing the joint restraint assembly 150 in the activated configuration. To disable the deactivation mechanism 138 and to position the joint restraint assembly 150 in the activated configuration from the deactivated configured, the deactivation lip 372 of the restraint base 270 can be disengaged from the deactivation slot 672. In example aspects, the deactivation lip 372 can be disengaged from the deactivation slot 672 by actuating the actuation end 680 of the top ledge 670 of the restraint cover 140. For example, a user can manually apply a force to the actuation surface 682 of top ledge 670 to flex the top ledge 670 relative to the front wall 646 away from the deactivation lip 372 of the restraint base 270. With the deactivation lip 372 disengaged from the deactivation slot 672, the restraint cover 140 can be slid axially away from the annular gland 132 in the general direction X, relative to the gland bore axis 236, which can disengage the stop leg 660 from the gripper 250.

To re-secure the restraint cover 140 to the restraint base 270 in the activated configuration, the force applied to the actuation end 680 of the restraint cover 140 can be released by the user, and the top ledge 670 can return to its equilibrium position, as described above. The deactivation lip 372 of the restraint base 270 can engage the activation channel 784 of the restraint cover 140 to retain the restraint cover 140 on the restraint base 270. According to example aspects, when the restraint cover 140 is slid in the general direction X, the stop ridge 678 can engage the deactivation lip 372 to prevent the restraint cover 140 from sliding off the joint restraint assembly 150 and can aid in locating the deactivation lip 372 in the activation channel 784. In other aspects, the restraint cover 140 can be removed from the joint restraint assembly 150 in the activated configuration.

With the stop leg 660 disengaged from the gripper 250, the spring clip 260 can bias the gripper 250 to rotate about the restraint pivot 274 towards engagement with outer surface 202 of the pipe 160. Specifically, the engagement leg 262 of the spring clip 260 can press on the rear wall 256 of the gripper 250 proximate the engagement end 252. According to example aspects, the engagement end 252 of the gripper 250 can contact the outer surface 202 in an initial engagement position. In one aspect, in the initial engagement position, the leading row 570 of gripping protuberances 560 can lightly contact the outer surface 202 of the pipe 160, but may not significantly dig into the outer surface 202. As such, the gripper 250 may not substantially resist axial movement of the pipe 160, relative to the gland bore axis 236, in an insertion direction Y. In other aspects, more or all of the rows 570,572,574,576 of the gripping protuberances 560 can lightly contact the outer surface 202 in the initial engagement position.

According to example aspects, the pipe 160 can be moved axially in a withdrawal direction Z opposite the insertion direction Y to cause the rows 570,572,574,576 of gripping protuberances 560 to dig into the outer surface 202 of the pipe 160. In example aspects, the withdrawal direction Z can be substantially the same as the direction X in which with restraint cover 140 can slide. For example, as shown, once the leading row 570 of gripping protuberances 560 dig into the outer surface 202, movement of the pipe 160 in the withdrawal direction Z, such as by water pressure within the pipe system, can cause further rotation of the gripper 250 towards engagement with the outer surface 202. The engagement end 252 of the gripper 250 can be configured to exert increasing pressure on the outer surface 202 as the gripper 250 is rotated into increasing engagement with the pipe 160. In a final engagement position, as illustrated, all of the gripping protuberances 560 can be engaged with the outer surface 202 of the pipe 160, thereby maximizing traction of the gripper 250 on the pipe 160. In example aspects, in the final engagement position, the stop leg 660 of the restraint cover 140 can serve as a stop to prevent the gripper 250 from rotating further into engagement with the pipe 160. Preventing further engagement can aid in preventing bending of the gripping protuberances 560 and/or shearing the gripping protuberances 560 or material from the outer surface 202 of the pipe 160.

In the present aspect, each of the joint restraint assemblies 150 can be individually moved from the deactivated configuration to the activated configuration, such as, for example, one at a time by a user manually disengaging the deactivation lip 372 from the deactivation slot 672. In other aspects, each of the joint restraint assemblies 150 can be moved to the activated configuration simultaneously. For example, in another aspect, each of the deactivation mechanisms 138 (e.g., restraint covers 140) can be connected by a single connector, such as a cable. The top ledge 670 of each of the restraint covers 140 can be biased radially inward, relative to the gland bore axis 236, by the cable. The cable can be cut to allow the top ledge 670 to naturally bias radially outward. As each top ledge 670 is biased radially outward, the deactivation lip 372 can disengage from the deactivation slot 672 and the spring force of the spring clip 260 can bias the gripper 250 into engagement with the outer surface 202 of the pipe 160.

Figure 9A:
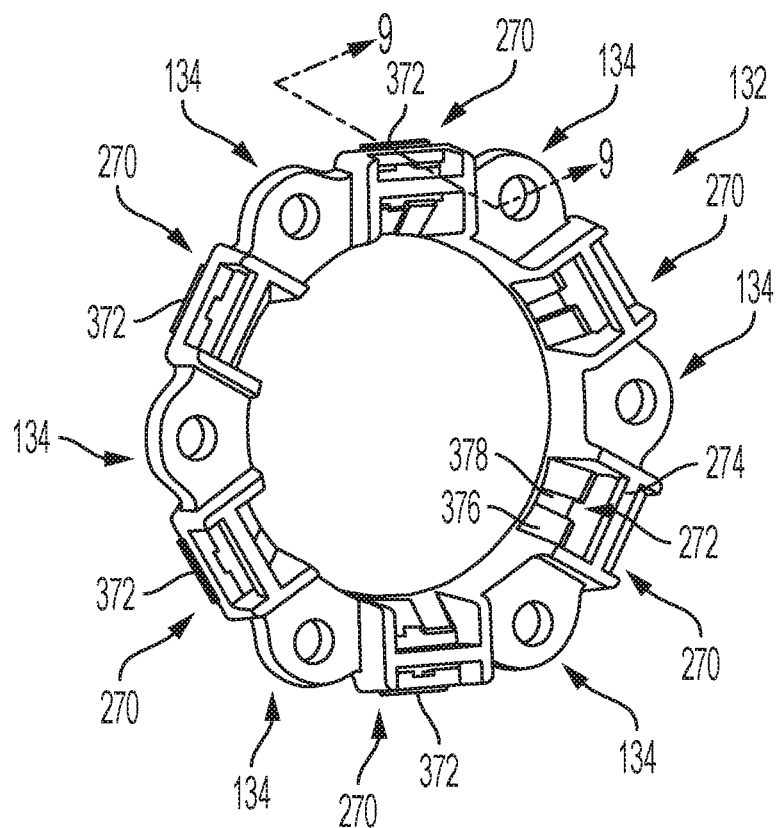
FIG. 9A is a front perspective view of the gland of the gland assembly of FIG. 1, in accordance with another aspect of the present disclosure.
Figure 9B:
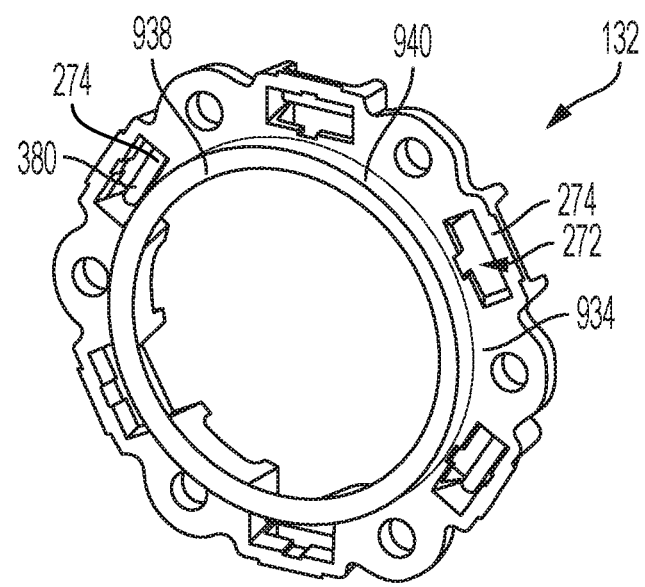
FIG. 9B is a rear perspective view of the gland of FIG. 9A.
Figure 9C:
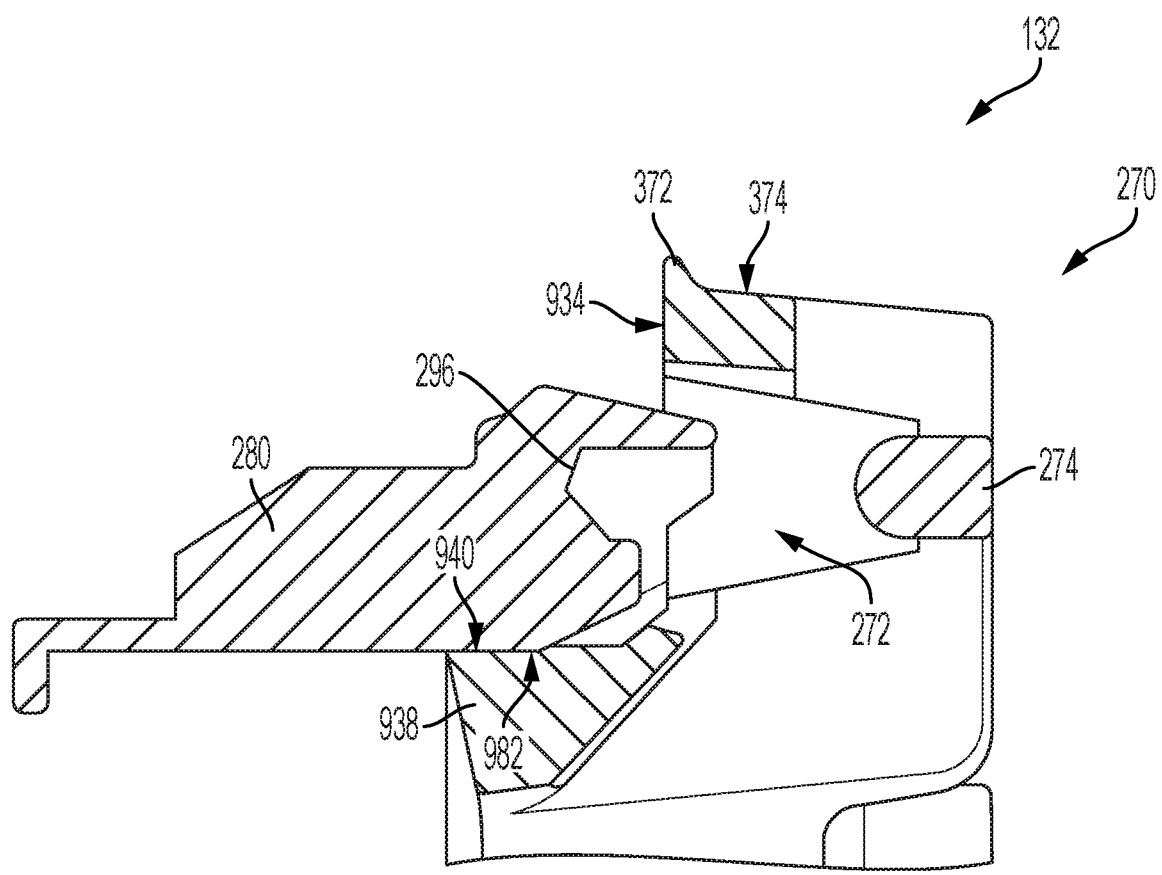
FIG. 9C is a cross-sectional view of the gland of FIG. 9A, taken along line 9-9 in FIG. 9A.

FIGS. 9A-9C illustrates an example aspect of the annular gland 132, wherein the annular gland 132 does not comprise that gland ribs 238, but rather can define an annular gland collar 938 extending from a rear surface 934 of the gland 132. The annular gland collar 938 can define a continuous gland engagement surface 940 configured to engage a continuous gasket engagement surface 982 of the gasket 280. In such an aspect, the stiffening ring 480 may not be present, as the annular gland collar 938 can apply a uniform force to the gasket 280 as the gasket 280 is compressed.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A gland assembly comprising:
   a gland, the gland defining a gland bore and a gland rib, the gland rib defining a rib engagement surface;
   a joint restraint assembly comprising:
      a restraint base formed on the gland;
      a gripper disposed within the restraint base; and
      a spring comprising a retention tab and an engagement leg, the engagement leg configured to engage the gripper; and
   a gasket defining a recess and a gasket engagement surface, the retention tab configured to engage the recess, the gasket engagement surface configured to engage the rib engagement surface.

2. The gland assembly of claim 1, wherein the gland further comprises a fastener pad, the fastener pad defining a hole configured to receive a fastener therethrough.

3. The gland assembly of claim 1, wherein:
   the restraint base defines a restraint pocket and a restraint pivot;
   the restraint pivot defines a restraint bearing surface; and
   the gripper defines a gripper bearing surface configured to engage the restraint bearing surface.

4. The gland assembly of claim 1, wherein:
   the gripper defines an engagement end and a lever end; and
   at least one protuberance is formed at the engagement end.

5. The gland assembly of claim 1, wherein the gasket defines a gasket bore extending from a first end of the gasket to a second end of the gasket.

6. The gland assembly of claim 5, wherein:
   the gasket defines a retention block at the first end; and
   the recess is formed in the retention block.

7. The gland assembly of claim 5, wherein the gasket defines a stop lip at the second end and a pipe collar extending from the second end towards the first end.

8. The gland assembly of claim 1, wherein:
   the gasket defines a gasket shoulder and a gasket engagement surface;

the gasket shoulder and gasket engagement surface define a gland rib pocket; and a stiffening ring engages the gasket shoulder.

9. The gland assembly of claim 1, wherein the joint restraint assembly is configurable in a deactivated configuration, wherein the gripper is biased in a disengagement direction, and an activated configuration, wherein the gripper is biased in an engagement direction.

10. The gland assembly of claim 9, wherein the restraint base comprises a deactivation lip;

the joint restraint assembly further comprises a restraint cover;

the restraint cover comprise a stop leg and a deactivation slot; and the stop leg engages the gripper and the deactivation lip engages the deactivation slot in the deactivated configuration.

11. A mechanical joint comprising:

a piping element defining a first flange and a socket, the socket formed proximate the first flange;

a pipe extending into the socket and defining an outer surface;

a gland assembly comprising:
  a gland defining a gland bore, the pipe extending through the gland bore;
  a joint restraint assembly comprising a gripper and a spring, the gripper configured to engage the outer surface of the pipe, the spring configured to bias the gripper towards engagement with the outer surface of the pipe, wherein the joint restraint assembly is configurable in a deactivated configuration, wherein the gripper is prevented from engaging the outer surface of the pipe, and an activated configuration, wherein the gripper is able to engage the outer surface of the pipe; and
  a gasket defining a recess, the spring configured to engage the recess; and a deactivation mechanism configured to engage the gripper and bias the gripper away from the outer surface of the pipe in the deactivated configuration.

12. The mechanical joint of claim 11, wherein:

the gland comprises a restraint base;

the restraint base defines a restraint pocket and a restraint pivot; and the gripper is configured to engage and pivot relative to the restraint pivot.

13. The mechanical joint of claim 11, wherein:

the gasket defines a first end and a second end;

a retention block is formed at the first end; and the recess is formed in the retention block.

14. The mechanical joint of claim 11, wherein:

the spring comprises an engagement leg and a retention tab;

the engagement leg engages the gripper; and the retention tab engaging the recess.

15. A gland assembly comprising:

a gland, the gland defining a gland bore;

a joint restraint assembly comprising;
  a restraint base formed on the gland;
  a gripper disposed within the restraint base; and
  a spring comprising a retention tab and an engagement leg, the engagement leg configured to engage the gripper; and a gasket defining a recess and a gasket bore, the retention tab configured to engage the recess, the gasket bore extending from a first end of the gasket to a second end of the gasket, the gasket defining a retention block at the first end, the recess formed in the retention block, the gasket further defining a stop lip at the second end and a pipe collar extending from the second end towards the first end.

16. A gland assembly comprising:

a gland, the gland defining a gland bore;

a joint restraint assembly comprising;
  a restraint base formed on the gland;
  a gripper disposed within the restraint base; and
  a spring comprising a retention tab and an engagement leg, the engagement leg configured to engage the gripper;

a gasket defining a recess, a gasket shoulder, and a gasket engagement surface, the retention tab configured to engage the recess, the gasket shoulder and gasket engagement surface defining a gland rib pocket; and a stiffing ring engaging the gasket shoulder.

17. A gland assembly comprising:

a gland, the gland defining a gland bore;

a joint restraint assembly comprising;
  a restraint base formed on the gland and comprising a deactivation lip;
  a restraint cover comprising a stop leg and a deactivation slot;
  a gripper disposed within the restraint base; and
  a spring comprising a retention tab and an engagement leg, the engagement leg configured to engage the gripper; and a gasket defining a recess, the retention tab configured to engage the recess;

wherein the joint restraint assembly is configurable in a deactivated configuration, wherein the gripper is biased in a disengagement direction, the stop leg engages the gripper, and the deactivation lip engages the deactivation slot, and an activated configuration, wherein the gripper is biased in an engagement direction.

* * * * *